United States Patent [19]

Bogert

[11] 4,152,958

[45] May 8, 1979

[54] FLUID JET CUTTING OF ROLLS OF MATERIAL

[76] Inventor: Clayton Bogert, Glen Rock, N.J. 07452

[21] Appl. No.: 777,495

[22] Filed: Mar. 14, 1977

[51] Int. Cl.$^2$ ........................... B23B 1/00; B23B 5/14

[52] U.S. Cl. ........................................... 82/47; 82/48; 82/50; 82/52; 82/101; 83/53; 83/177

[58] Field of Search ....................................... 82/46–48, 82/50–54, 101; 83/53, 177

[56] References Cited

U.S. PATENT DOCUMENTS

| | | | |
|---|---|---|---|
| 1,699,760 | 1/1929 | Sherman | 83/53 |
| 3,083,601 | 4/1963 | Leiss et al. | 82/50 X |
| 3,532,014 | 10/1970 | Franz | 83/177 X |
| 3,985,848 | 10/1976 | Frische et al. | 83/177 X |

OTHER PUBLICATIONS

"Fluid Jet Cutter for Plastics" SPE Journal, Jul. 1972, p. 5, vol. 28, No. 7.

*Primary Examiner*—Leonidas Vlachos
*Attorney, Agent, or Firm*—Arthur A. March

[57] ABSTRACT

Apparatus and method for fluid jet cutting of a roll of material in situ, e.g. a multiplicate wound roll of material, by which a fluid jet nozzle and a roll of material are rotated relatively to each other about an axis with the roll of material in radially inwardly disposed relation to the nozzle while a fluid jet, e.g. liquid jet, exiting from the nozzle is directed at a selective axial point along the extent of the roll of material to cut circumferentially into and through the roll of material in situ and the spent fluid is concomitantly collected radially inwardly of the roll of material, preferably in an arrangement having fluid jet cutter means including such nozzle, support means including mandrel means, e.g. a stationary mandrel, for operatively rotationally supporting removably thereon the roll of material in a position along the axis in radially inwardly disposed relation to the nozzle for relative rotational movement between the roll of material and such nozzle and mandrel means, about the axis and further including rotational mounting means, e.g. a chuck drive, for mounting the roll of material for rotation about the axis and about the mandrel means, in such position, and fluid receiving means operatively disposed radially inwardly of the position of the roll of material, e.g. a trough selectively defined in the periphery of the mandrel, for collecting spent fluid, with the nozzle being selectively disposed in operatively flow aligned relation to the fluid receiving means at such axial point.

32 Claims, 8 Drawing Figures

FLUID JET CUTTING OF ROLLS OF MATERIAL

Figure 1:
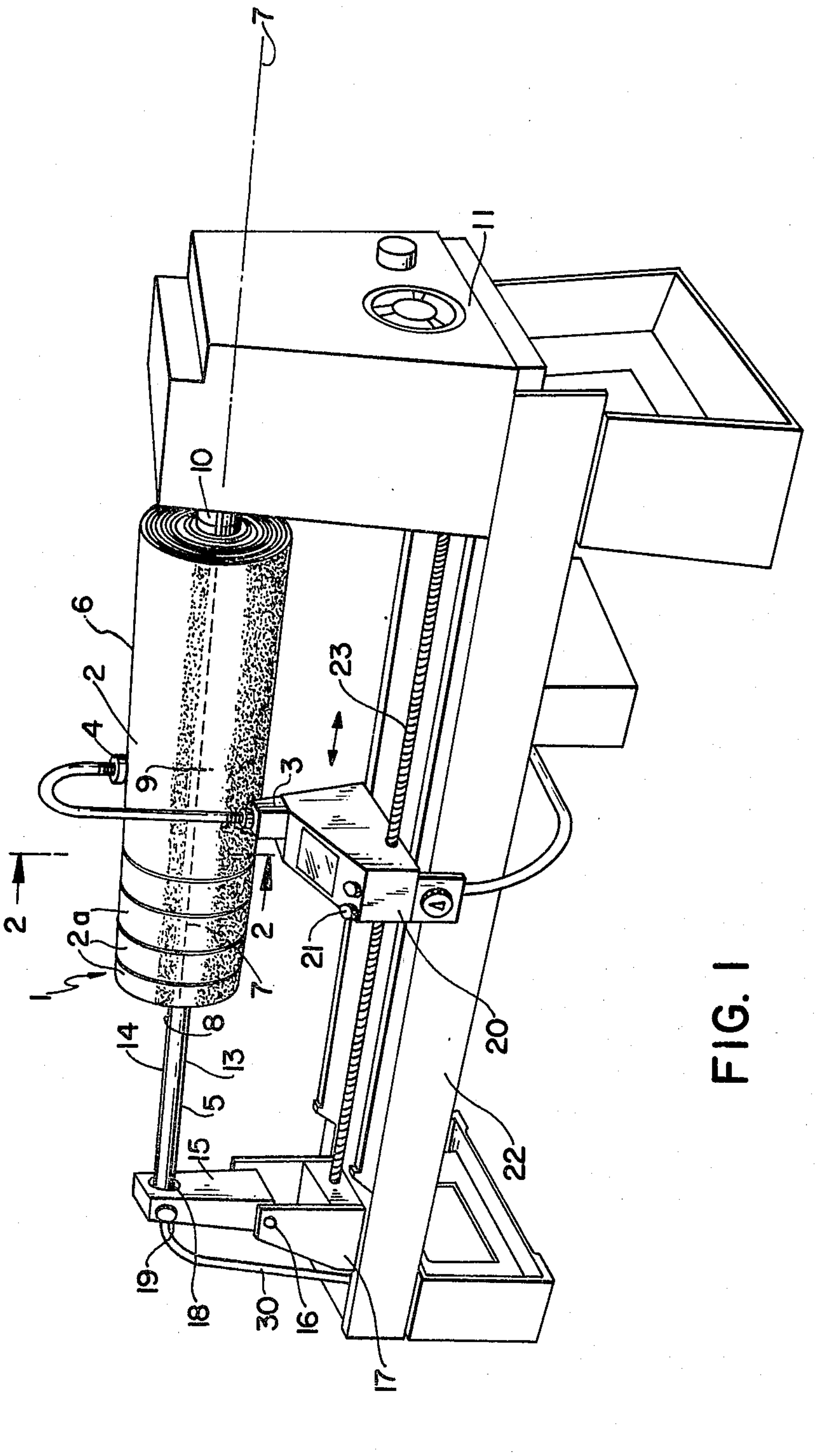

The present invention relates to the fluid jet cutting of rolls of material in situ, and more particularly to an apparatus arrangement and method therefor by which a fluid jet is used to cut circumferentially into and through the roll of material in situ during relative rotation of the fluid jet and roll of material with respect to each other about an axis with the roll of material in radially inwardly disposed relation to the fluid jet.

For economy in production, it is common industrial practice to produce textiles, plastics, paper, various laminates and many other materials in sheet, film, foil or analogous planar form, usually in pronouncedly wide widths and extremely long or continuous lengths, and wind them around a tube or core fabricated of paper or similar type commercially available material to a relatively large diameter, forming what is generally known as a master roll or mill roll. There are primarily two presently used industrial scale methods of cutting the material on these master rolls into narrower widths. Both involve cutting the material one ply at a time.

One such cutting method involves single knife in situ mechanical slitting in which a solid knife edge generally tangentially arranged at the side of the roll, which is rotating around a solid stationary shaft, e.g. via a chuck drive, radially enters the roll thereat to effect the in situ cutting. Such knife edge may take the form of a rotating disc knife arranged for rotation on an axis parallel to that of the roll and movable radially into and through the rotating roll and usually also its core, or a simple longitudinal or bayonet-type knife brought tangentially against or into the periphery of the rotating roll for such radial cutting. In some instances, the stationary shaft which is usually made of steel is provided with a covering strip of fiber along its length and within the range of the knife edge to prevent the radially moving knife edge from coming into contact with the shaft and thus protecting the knife edge from damage. As an alternative, a pair of such knives is provided in certain instances, e.g. rotating disc knives, the two knives entering the roll from opposite sides, whereupon the shaft may be equipped with a fiber sleeve to protect both knives from hitting the steel shaft.

The other such cutting method involves master roll rewind mechanical slitting in which the master roll is placed on a driven core shaft and the material is unwound, slit and rewound into separate correspondingly smaller rolls in a more or less continuous operation. One type of driven core shaft is a solid steel shaft having a leaf blade for grabbing the core of the roll slid thereover in order to drive the core and its roll as the driven core shaft rotates. Another type of driven core shaft is of the expanding kind wherein the shaft outwardly expands into driving engagement with the core of the roll slid thereover for rotating the roll therewith. In the rewind slitting operation, the master roll is driven and as the material unwinds it usually goes through a tensioning frame to hold it taut for simultaneous cutting by a series of spaced apart knives disposed along the width of the material as it travels along its unwinding path, with the separately slit narrower width portions being simultaneously rewound on individual roll cores. In rewind slitting, there are many different types of knives for different types of materials to be cut or slit as the artisan will appreciate.

A non-mechanical method of cutting is also known which is employed commercially for cutting paper, plastics, non-woven materials, leather, etc., especially in sheet, film, foil or analogous planar form, for instance as individual elements of relatively narrow width and short length superimposed in stacked arrangement, often in providing oddly shaped or contour products conforming to a given cutting pattern. Such non-mechanical method consists of fluid jet cutting and is accomplished normally by subjecting a fluid such as water, perhaps containing an additive polymer, to intense pressure, e.g. 40,000 psi (2812 kg/cm$^2$), and emitting it from a nozzle having a minute opening, e.g. orifice diameter of 0.003–0.012 in. (0.076–0.304 mm), so that it forms a high intensity, cohesive, needle-like jet which has the ability to cut non-metallic materials, one ply at a time or in stacked multiple-ply arrangement, cleanly, extremely quickly and with only a negligible waste of material. The spent jet fluid is generally a slurry of water, or water-polymer mixture, and minute particles of the material being cut.

Typical known fluid jet cutting apparatus and methods in this regard are disclosed, for instance, in U.S. Pat. Nos. 1,699,760 to Sherman; 2,658,427 to VerDoot, Jr.; 2,667,106 to Hyman et al; 3,625,813 to Eckelman; 3,517,578 to Krofta; 3,532,014 to Franz; and 3,891,157 to Justus.

However, there has been no application of the non-mechanical fluid jet cutting operation to the dynamic cutting of a master roll or mill roll of multiplicate wound material in situ because no device has been suggested or developed for accomplishing the task in a practicable manner and which successfully simultaneously provides also for the catching, conveying away and/or draining off of the resultant fluid jet spent slurry or effluent including entrained kerf cut particles from the immediate vicinity of the confined cutting site without detriment to or contamination of the material being cut.

On the other hand, the mechanical master roll cutting operation using one or more knife edges to effect the cutting of the master roll of multiplicate wound material in situ one ply at a time suffers from the obvious primary drawback that the knife edge or edges must be continually sharpened and even then precise clean-cut edges do not necessarily result, and furthermore has the disadvantages of requiring elaborate and complex apparatus and controls, increased energy consumption, comparatively slow cutting times, and close attention and surveillance by the operator, of producing comparatively high kerf cut wastage, and even edge tearing and edge folding-back, of generating excessive kerf dust and noise, and of presenting a dangerous working environment due to possible mechanical malfunction of the machine parts, flying debris, dust, etc.

It is among the objects and advantages of the present invention to overcome the above-mentioned drawbacks and disadvantages, and to provide a novel and efficient arrangement and method for the fluid, preferably liquid, jet cutting of rolls of material in situ crosswise of the axis of the roll whereby to form narrower in situ rolls of such material from a comparatively wider width or master roll of such material, in a simple, rapid and inexpensive manner and utilizing durable and uncomplicated constructional means.

It is among the further objects and advantages of the invention to provide an arrangement and method of the foregoing type in which a fluid jet is used to cut circumferentially into and more or less radially through the roll of material in situ during relative rotation of the fluid jet and roll of material with respect to each other about an axis with the roll of material in radially inwardly disposed relation to the fluid jet, for wide range, industrial scale, practicable and versatile adaptability and applicability to various types, widths and diameters, and weights of roll material, e.g. to cut paper, plastics, textiles of the woven and non-woven kinds, laminates, artificial leather, and like materials in sheet, film, foil or analogous planar form, especially in extremely long or continuous length strips in roll or multiplicate wound disposition on a tubular core.

It is among the still further objects and advantages of the invention to provide such an arrangement and method whereby the roll of material is cut in situ into separate rolls of narrow widths in a multiple ply continuous cutting manner rather than one ply at a time and while simultaneously also providing for the effective collecting and removal, or catching, conveying away and/or draining off, of the resultant fluid jet spent slurry or effluent including entrained kerf cut particles or dust, from the immediate vicinity of the confined cutting site without consequent detriment to or contamination of the material being cut.

It is among the still further objects and advantages of the invention to provide such an arrangement and method whereby the spatial disposition and geometric orientation of the fluid jet and roll of material being cut in situ are such that maximum cutting force of the jet is exerted peripherally at the larger outer circumference of the multiple ply roll of material while still leaving sufficient remaining cutting force as the jet proceeds radially inwardly to effect the necessary cutting centrally at the comparatively smaller inner circumference of the roll of material at the tubular core.

Figure 2:
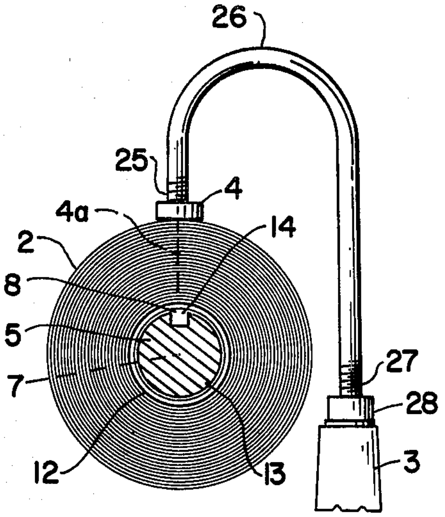

Other and further objects and advantages will become apparent from a study of the within specification and drawings, in which:

FIG. 1 is a schematic perspective view of an apparatus arrangement according to an embodiment of the present invention, FIG. 2 is a schematic sectional partial view taken along the line 2—2 of FIG. 1.

Figure 6:
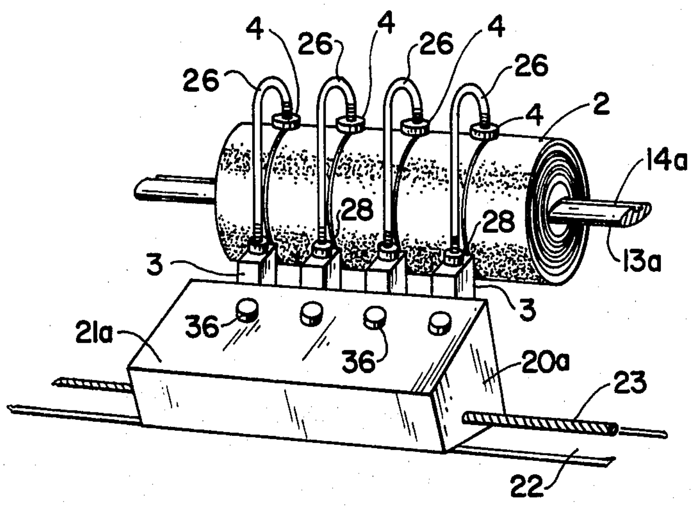
Figure 3:
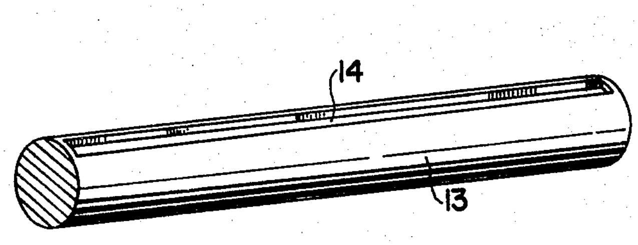
Figure 4:
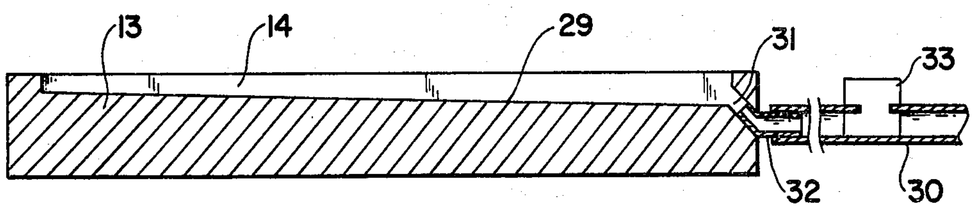
Figure 5:
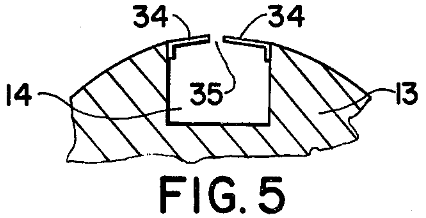
Figure 7:
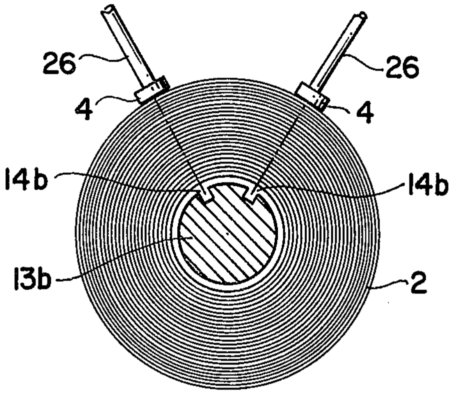
Figure 8:
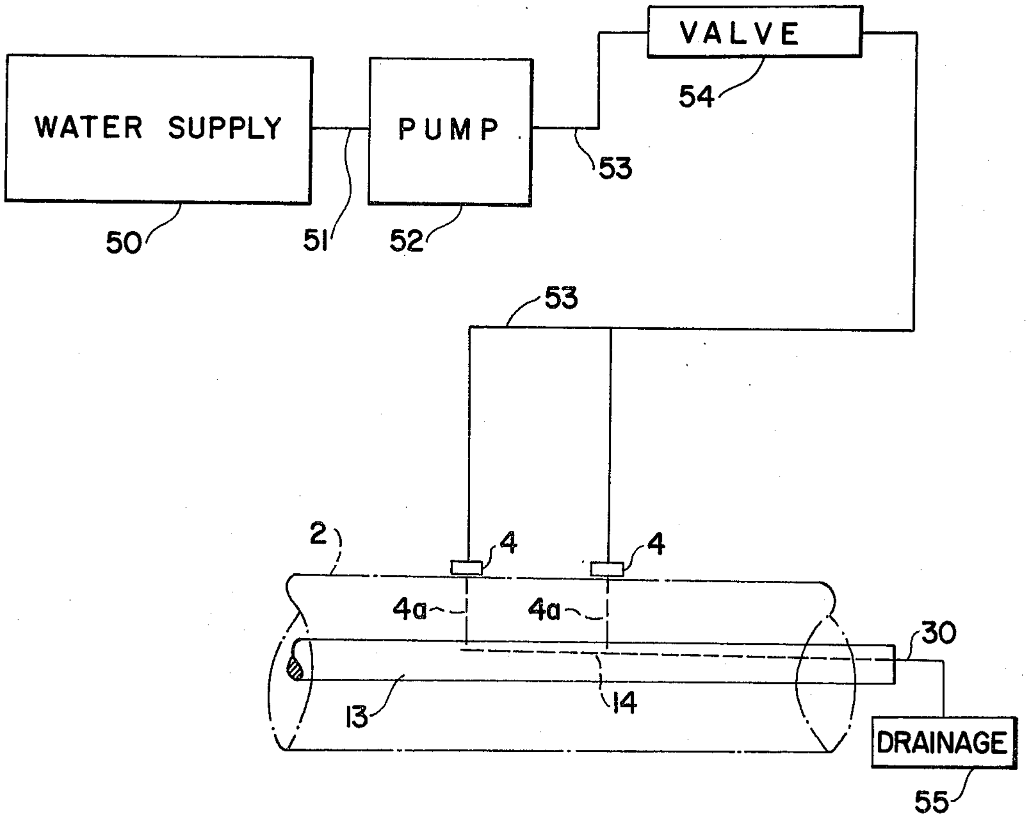

FIG. 3 is a schematic perspective view partially in section of a mandrel, exaggerated in radial dimension and reduced in axial dimension, and showing fluid receiving means in accordance with a feature of the invention, FIG. 4 is a schematic sectional view of the mandrel of FIG. 3, similarly exaggerated in radial dimension and reduced in axial dimension, and showing further details of construction, FIG. 5 is a schematic enlarged partial sectional view of the mandrel showing another form of the fluid receiving means, FIG. 6 is a schematic perspective partial view of another embodiment of the invention, FIG. 7 is a schematic sectional partial view similar to that of FIG. 2 but showing another embodiment of the invention, and FIG. 8 is a schematic view indicating the fluid jet supply system and recovery means in relation to the fluid jet nozzle means, roll of material to be cut in situ, weight supporting mandrel and fluid receiving means, according to an embodiment of the invention.

Briefly, the present invention contemplates an apparatus combination arrangement and method utilizing a fluid jet from a nozzle to cut circumferentially into and through a roll of material in situ, including all of the multiple plies thereof simultaneously rather than one at a time, during relative rotation of the fluid jet and roll of material with respect to each other about an axis with the roll of material in radially inwardly disposed relation to the fluid jet, and further utilizing fluid receiving means radially inwardly of the position of the roll of material for effectively collecting spent fluid.

In accordance with one aspect of the invention, a fluid jet cutter apparatus combination arrangement is provided for cutting a roll of material in situ, more particularly comprising fluid jet cutter means including a fluid jet nozzle, support means for operatively relatively rotationally supporting removably a roll of material to be cut in situ in a position along an axis in radially inwardly disposed relation to the nozzle for relative rotational movement between the roll of material and the nozzle about the axis, and fluid receiving means operatively disposed radially inwardly of the position of the roll of material for collecting spent fluid. The nozzle is selectively disposed in operatively flow aligned relation to the fluid receiving means at a point along the axis for causing a fluid jet exiting from the nozzle to cut circumferentially into and more or less radially through the roll of material in situ at such point and to be collected by the fluid receiving means during relative rotational movement between the nozzle and the roll of material.

The support means preferably advantageously includes for instance rotational mounting means for mounting the roll of material for rotation about the axis in such position, as well as carriage means for moving the nozzle along the axis to change the selective disposition of the nozzle and the corresponding location of such point where the cut is to take place.

The fluid jet cutter means may include optionally a plurality of such fluid jet nozzles selectively disposed at axially spaced apart points along the axis for cutting the roll of material in situ simultaneously at such corresponding points. In this regard, the nozzles may be positioned in substantially radially aligned relation along the axis for cutting the roll of material into an appropriate corresponding number of smaller width rolls of material still maintained in situ on the support means, or where the nozzles would otherwise interfere with each other as in the case of cutting the roll of material into extremely narrow width smaller rolls, i.e. less than the width of the corresponding nozzles, such nozzles may be positioned in selectively radially offset relation along the axis whereby to accommodate their widths in relative axially overlapping relation yet maintain them in unhindered disposition to cut the roll of material into such extremely narrow width smaller rolls.

In either case, similar provision for carriage means is contemplated for moving the plurality of nozzles along the axis to change the selective disposition of the individual nozzles and the corresponding locations of such points where the cuts are to take place.

Removal means are desirably also provided for removing spent fluid received in the fluid receiving means. Such removal means may include a discharge conduit operatively flow-connected to the fluid receiving means. In turn, increased flow-inducing means such as a suction or vacuum pump may be included in the flow-off line or discharge conduit for enhancing removal in a positive flow manner of fluid received in the fluid receiving means.

In accordance with one particular feature of the invention, the support means includes preferably a mandrel extending along the axis for operatively supporting thereon the weight of the roll of material for relative rotational movement therebetween. In this instance, the fluid receiving means may include a trough or troughs selectively defined in the periphery of the mandrel in operatively flow aligned relation to the nozzle or nozzles as the case may be. Each such trough may extend axially along the mandrel sufficiently to provide the desired flow aligned relation to the appropriate nozzle in any selective disposition of the nozzle.

The axis is preferably oriented as a substantially horizontal axis and the trough in such instance may be provided with an internal flow path operatively downwardly inclined with respect to such horizontal axis along the mandrel substantially from one axial end portion of the trough to the other, e.g. to enhance gravity flow where the fluid jet is a liquid jet such as water or water-containing liquid and the corresponding spent fluid is a slurry of such liquid with entrained kerf cut particles removed from the roll of material during the cutting operation.

In accordance with another feature of the invention, the trough is advantageously provided along its outward marginal portions located at the periphery of the mandrel with deflector shield means to prevent outward escape of fluid received in the trough.

The fluid jet cutter apparatus combination arrangement preferably more specifically comprises liquid jet cutter means including a liquid jet nozzle, support means including a mandrel extending along a substantially horizontal axis for operatively rotationally supporting removably thereon the weight of a roll of material to be cut in situ in a position along the axis in radially inwardly disposed relation to the nozzle for relative rotational movement between the roll of material on the one hand and the nozzle and mandrel on the other hand about the axis, and further including rotational mounting means for mounting the roll of material for rotation about the axis and about the mandrel in said position, and a liquid receiving trough operatively disposed radially inwardly of the position of the roll of material and selectively defined in the periphery of the mandrel for collecting spent liquid, the nozzle being selectively disposed in operatively flow aligned relation to the trough at a point along the mandrel for causing a liquid jet exiting from the nozzle to cut circumferentially into and completely through the roll of material in situ at such point and be collected by the trough during rotation of the roll of material.

In accordance with another aspect of the invention a method for fluid jet cutting of a roll of material in situ is provided, more particularly comprising rotating a fluid jet nozzle and a roll of material to be cut in situ relatively to each other about an axis with the roll of material in radially inwardly disposed relation to the nozzle while directing a fluid jet exiting from the nozzle at a selective axial point along the extent of the roll of material to cut circumferentially into and through the roll of material in situ, and collecting spent fluid radially inwardly of the roll of material during such directing of the fluid jet.

Preferably, the roll of material is rotated and the nozzle is maintained rotationally stationary, and the fluid jet is a liquid jet such as water or a water-containing liquid having a polymer additive in accordance with conventional technique, e.g. a known mixture of water and a long-chain polymer of the type normally used in fluid jet cutting operations.

Referring to the drawing, and especially FIG. 1, an apparatus combination arrangement 1 is shown for the fluid jet cutting of a roll of material 2 in situ by fluid jet cutter means 3 of the conventional type terminating in a nozzle 4 of selective orifice diameter positionable in operative generally radially inwardly facing relation to the roll of material 2 for the desired purpose. Support means, generally indicated at 5, are provided for operatively relatively rotationally supporting removably the roll of material 2, which is to be cut in situ, in a position 6 for example as shown, along an axis 7 in radially inwardly disposed relation to the nozzle 4 for relative rotational movement between the roll of material and the nozzle about such axis, and fluid receiving means 8 in turn are operatively disposed radially inwardly of the position 6 of the roll of material 2 for collecting spent fluid (see FIG. 2).

Advantageously, the nozzle 4 is selectively disposed in operatively flow aligned, more or less radial, relation to the fluid receiving means 8 at a point 9 along the axis 6 for causing a conventional fluid jet (shown schematically at **4*a* in FIG. 2), emitted at or exiting from the nozzle 4, to cut circumferentially into and, more or less radially inwardly, through the roll of material 2 in situ at such point and to be collected by the fluid receiving means 8** during relative rotational movement between the nozzle and roll of material.

The support means 5 generally includes rotational mounting means 10, e.g. in the form of a conventional chuck drive connected for rotation either in forward or reverse direction at an infinitely variable selective speed via conventional positive drive means (not shown) within housing 11, for mounting the roll of material 2 for rotation about the axis 7 in such position 6.

For this purpose, the roll of material is provided usually and preferably with a central tubular core 12 (see FIGS. 1 and 2) onto which the continuous strip of material to be cut is pre-wound. In this way, a multiplicate wound or multiple ply more or less planar spiral or helical winding type master roll or mill roll of material of selective width and circumference may be provided, having a corresponding selective outside diameter at the periphery as determined by the amount of wound material present and a corresponding selective inside diameter as determined by the diameter of the tubular core used.

Such tubular core 12 is often provided in the form of a relatively thin-walled yet rigid and sturdy paper laminate or paper board tube of the conventional type which is sufficient to support and accommodate the winding of the particular strip material in question thereon to the desired overall outside diameter of the roll, and in turn to be rotationally mounted over the support means and be controlled for rotation by the rotational mounting means 10 thereof. Of course, the axial length of the tubular core 12 will preferably correspond to the width of the strip of material to be wound thereon in accordance with the normal commercial practice.

The support means 5 generally also includes core shaft or mandrel means, such as a stationary mandrel 13, e.g. fabricated of steel or other sturdy metal, extending along the axis 7 for operatively supporting thereon the full weight of the roll of material 2 for relative rotational movement therebetween. Accordingly, the fluid receiving means 8 may be provided in the form of a trough 14 of any suitable cross-sectional shape selectively defined in the periphery of the mandrel 13 in operatively flow aligned relation to the nozzle 4 (see FIGS. 1 to 3).

Mandrel 13 may be suitably fixedly mounted at one end thereof in housing 11 by conventional means (not shown), and the other or free end thereof may be releasably mounted in swingable arm 15 journaled at its lower end via transverse pivot 16 to stationary bracket 17 and carrying a mandrel seat opening 18 at its upper end. Seat opening 18 is provided with a manual tightening screw 19 communicating therewith through a threaded bore (not shown) in the upper end portion of swingable arm 15.

Hence, to load the arrangement with a roll of material, screw 19 is loosened from engagement with the free end portion of mandrel 13, enabling arm 15 to be swung about pivot 16 outwardly and downwardly away from the mandrel. The pivot 16 is located at a selective radial distance from the axis 7 and in turn from mandrel 13 to provide sufficient clearance thereat for a roll of material 2 of the contemplated outside diameter and circumference to be slid axially onto and along the mandrel 13 without hinderance until it reaches the other end of the mandrel for mounting on rotational mounting means 10.

Similarly, seat opening 18 is of selective internal open diameter and axial length so as to provide sufficient clearance thereat for arm 15 to be swung outwardly and downwardly away from the end of the mandrel seated therein without hinderance. The necessary loose play between the internal open diameter of the seat opening 18 and the end of the mandrel thereat is effectively taken up by the tightening of screw 19 against the mandrel for achieving the desired rigid releasable mounting of such end of the mandrel.

Preferably, the inner end of manual tightening screw 19 may be provided with a seating shoe of the conventional type (not shown) for attaining a substantially tight releasable connection between the free end of the mandrel 13 and the seating opening 18.

Of course, as the artisan will appreciate, other suitable means for releasably mounting the mandrel may be employed, so long as the mandrel is maintained in proper operative relation and alignment along the axis 7 in substantially fixed distance relation to the roll of material thereon and to the nozzle for the desired purposes.

The rotational mounting means 10, shown in the form of a conventional radially outwardly expandable annular chuck drive, is disposed in the usual way over the fixedly mounted end of mandrel 13 and connected to positive drive means (not shown) for rotation about the mandrel. The adjacent end of the tubular core 12 of the roll of material 2 is slid over the chuck drive initially maintained in retracted position whereupon the chuck drive is expanded in the conventional manner into internal gripping relation with the interior wall of the core to provide a positive rotational mounting connection therebetween. As the artisan will appreciate other types of chucks or chuck drive arrangements may be provided according to conventional technique so long as the desired purposes are accomplished.

Moreover, it will be realized that, although less preferred from a practical and efficiency standpoint, the roll of material in certain instances may be provided as a self-sustaining roll without a separate tubular core, e.g. depending upon the type of material making up the roll, the function of the omitted core being assumed by the innermost spiral or spirals of the strip material in question. Naturally, the innermost spiral in this regard must provide a sufficient internal diameter free space or tube space so that the roll may be properly slid onto the mandrel and be rotationally mountedly connected directly to the annular chuck drive or the like in the stated manner.

In either instance, i.e. whether a separate tubular core is present or omitted from the roll of material, the chuck mounting connection or the like utilized should be preferably of a type which achieves a rotationally mounting connection of the roll of material in a sure and tightly gripping manner, as far as possible without marring or adversely affecting the integrity of the strip material in situ rolled condition thereat or detracting from the cutting operation or its sought objectives and results.

In this regard, it will be realized that the inherent structural integrity of the entire radial extent of the roll, whether the tubular core is omitted or present, will still be sufficient to transmit, until completion of the severing, the full rotational forces or torque from the positive drive via the chuck mounting connection to the roll of material throughout the axial extent of such roll. This is because of the undisturbed in situ disposition of the roll during the entire cutting and the fact that completion of the severing according to the multiple ply fluid jet cutting operation of the invention occurs simultaneously for all of the plies or individual windings as the more or less radial cutting incrementally progresses circularly around the entirety of the roll back to the starting point (see FIG. 2).

Moreover, consonant with such feature is the fact that such in situ multiple ply simultaneous cutting advantageously permits, by reason of the inherent spatial disposition and geometric orientation of the fluid jet and the roll of material, maximum cutting force of the jet to be exerted peripherally along the longer cutting path at the larger outer circumference of the roll of material while still leaving sufficient remaining cutting force as the jet proceeds progressively radially inwardly during relative rotation of the nozzle and roll of material with respect to each other to effect in turn the necessary cutting centrally along the shorter cutting path at the comparatively smaller inner circumference of the roll of material at the tubular core, or at the innermost windings of the roll of material when the tubular core is omitted (see FIG. 2).

The gradient in rotational speed as between the longer outer cutting path and shorter inner cutting path is such that the initial maximum selective force of the fluid jet is efficiently applied immediately and directly to the relatively faster traveling outer spiral layers and the residual partially spent force is concomitantly efficiently applied in turn to the relatively slower traveling inner spiral layers.

Concordant effective utilization of a given force of fluid jet may be therefore attained according to the concept of the invention, in this regard, more or less independently of the selected speed of relative rotation between the roll of material and nozzle, of the selected radius of the roll of material, and of the constitution of the particular strip material comprising the roll. This permits distribution inherently of the full force or dynamic pressure of the fluid jet throughout the cutting path both circumferentially and radially during the relative rotation of the elements in question, whereby suitable adjustment of the delivery force or pressure of the fluid jet may be economically selected, so long as it is operative for the particular strip material to be cut, and attendant factors such as rotational speed and maximum circumference of the roll of material may be accommodated thereto.

Hence, at a given delivery force of the fluid jet operative to cut a particular composition of strip material, maximum circumference rolls may be processed by suitable adjustment of the rotational speed, the function of such speed inherently representing a saving in energy and equipment requirements for generating the fluid jet. Thus, while such jet generating requirements for a given composition of strip material to be cut may vary directly with the roll circumference and/or rotational speed, the energy and equipment requirements for effecting rotation may be reduced for a given roll circumference to maximize the available jet force or reduce its generating requirements as well.

However, since the weight of the roll of material will basically be supported on the stationary mandrel, such rotation effecting requirements generally will be limited to the capacity of the motive means contemplated such as the size of an infinitely variable speed electric motor and its power consumption. Since usually only a single turn or rotation of the roll of material will be needed to effect complete severing during the cutting operation, the speed, capacity and power consumption of the motor will normally be minor in importance as compared to other factors. In practice, high cutting rates will be possible, thus leading to savings overall of time, labor, energy, material wastage, etc., as compared with conventional practices.

In order to permit convenient longitudinal travel of the nozzle 4, the support means 5 may also include advantageously carriage means 20 on which the fluid jet cutter means 3 can be located. Carriage means 20, here shown in a form also containing a control console panel 21 for immediate yet safe access to the operator, is slidably or guidably mounted on base 22 via appropriate tracks or rails or the like in the conventional manner for reciprocal movement back and forth therealong parallel to the axis 7. A drive worm 23 operatively mounted between stationary bracket 17 and housing 11 and driven selectively in forward and reverse rotational directions by means (not shown) located in housing 11, may be provided for effecting the reciprocal movement of carriage means 20, although manual movement thereof is also contemplated by the invention.

Worm 23 operatively extends through the lower portion of carriage means 20 for this purpose and engages an appropriate follower mechanism of a known type (not shown) within carriage means 20 such that the rotary motion of drive worm 23 is transmitted via the follower mechanism to the carriage means to drive the latter along the reciprocal axial or longitudinal path extending generally between housing 11 and stationary bracket 17.

In this manner, nozzle 4 may be appropriately moved back and forth along the axis 7 to change the selective disposition of the nozzle and in turn the corresponding location of the point 9 where the cut is to be made. Since the roll of material 2 throughout the operation will be maintained in fixed axial disposition, rotationally mounted on the chuck drive, nozzle 4 and the roll of material will only be able to execute relative rotational movement with respect to each other whereas the nozzle on the carriage means 20 will also be able to execute actual axial movement as well.

Nevertheless, it will be appreciated by the artisan, that the arrangement can also be alternatively provided, although less preferred, such that the nozzle remains fixed axially while the chuck drive and roll of material are axially movable reciprocally along the mandrel for changing the location of the point 9, and furthermore such that the roll of material remains fixed rotationally while the nozzle, e.g. in a conventional planetary gear mounting cage or the like is rotatable around the rotationally stationary roll of material for effecting the cutting operation, preferably with the mandrel 13 and especially the trough 14 being simultaneously concordantly rotatable therewith to maintain the desired radial flow alignment between the nozzle emitted fluid jet 4*a* and the fluid receiving trough 14 during the cutting operation (cf. FIG. 2).

Because of the more elaborate mounting and support arrangements required to provide for actual peripheral rotation of the nozzle about the axis 7 and about the roll of material while the roll of material remains rotationally fixed, the embodiment orientation corresponding to the relative rotational movement between the roll of material and the nozzle about such axis as shown in FIG. 1 is generally contemplated and described herein, although both rotational concepts are intended to be embraced by the present invention, i.e. that where the nozzle is preferably rotationally stationary and the roll of material is rotatably movable as well as that where the roll of material is less preferably rotationally stationary and the nozzle is rotatably movable peripherally thereabout.

The controls on panel 21 may include in the conventional manner suitable switches, control knobs and the like for selective forward and reverse movement, and stoppage, of drive screw 23 for moving nozzle 4 along the roll of material, for selective infinitely variable speed rotation of the roll of material via the chuck drive 10, in either forward or reverse direction, and for selective delivery force or pressure flow and stoppage of the fluid jet emitted from nozzle 4. Suitable electrical conduits (not shown) may be provided in the usual way between the respective controls on panel 21 of the carriage means 20 and the appropriate circuits provided to energize the motive means (not shown) such as electric motors for driving worm 23, chuck drive 10 and the pressure generating and valve mechanisms of the fluid jet cutter means.

However, one end of the fluid supply hose 24 is shown, connected at its other end with the delivery pressure fluid source such as water (not shown). Fluid supply hose 24 is mounted for movement with carriage means 20 and is flow-connected by conduit means (not shown) of the conventional type with nozzle 4 for the desired purposes.

As may be noted more clearly in FIG. 2, the nozzle 4 may be suitably provided as a manually adjustable or tool adjustable nozzle by means of a conventional threaded connection 25 at the outer end of the fluid jet cutter means delivery tube 26. This will permit relatively precise selective adjustment of the nozzle face toward or away from the adjacent periphery of the roll of material in the position 6 thereat, as the case may be.

However, larger variations in adjustment may also be suitably provided by means of a threaded connection 27 at the exposed base portion of delivery tube 26 and a cooperating manually adjustable or tool adjustable nut 28 on the adjacent mounting portion of the fluid jet cutter means 3 thereat in the known manner (see FIG. 2). The latter will permit the delivery tube 26 to move inwardly or outwardly of the fluid jet cutter means mounting portion to effect in turn corresponding larger amplitude selective movement of the nozzle face toward or away from the adjacent periphery of the roll of material in its mounted position on the mandrel 13, as the case may be whereby to accommodate different circumference or diameter size rolls of material.

The nozzle 4 will advantageously be exchangeable with other nozzles of selectively different orifice diameters, each of which may be simply threaded onto the adjacent end of the delivery tube 26.

In any case, the nozzle face is intended for best results in the usual instance to be maintained immediately adjacent and in close proximity to the surface of the periphery of the roll of material thereat. This will reduce loss of fluid force or energy at any gap otherwise present thereat, and avoid undesired splattering, splashing or uncontrolled leakage or dissipation of fluid and kerf cut particles or dust thereat and concomitant danger to the operator, i.e. during both the initial hole cutting and thereafter.

On the other hand, according due regard for the degree of compactness or give or resiliency of the strip material in roll form, its relative taut condition in such spiral arrangement, and the inherent surface configuration and attendant surface friction of the particular material in question, the nozzle should not be maintained in such pronounced touching relation with the adjacent surface of the periphery of the roll of material as will cause binding or interference with the cutting operation or with the relative rotation or axial displacement as between the nozzle and roll of material, or as will cause undue vibration of the nozzle to the extent of presenting a danger to the operator or of marring the preciseness or evenness of the cut.

In order to accommodate axial movement of the nozzle 4 via carriage means 20, the trough 14 in mandrel 13 advantageously extends axially along the mandrel sufficiently to provide the desired flow aligned relations to the nozzle, i.e. in any selective disposition of the nozzle (see FIGS. 1 and 3). Moreover, the axis 7 is preferably a substantially horizontal axis whereupon in turn the trough may be desirably provided with an internal flow path 29 operatively downwardly inclined with respect to such horizontal axis along the mandrel substantially from one axial end portion of the trough to the other (see FIG. 4). This will induce positive directional flow, in the direction of the arrows shown in FIG. 4, of spent fluid and entrained kerf cut particles or dust received in trough 14, e.g. in the form of an aqueous slurry where water or a water-containing liquid is used as the fluid jet.

The removal means for removing fluid received in the trough 14 preferably also include a discharge conduit 30, e.g. in the form of a pliable plastic or rubber drainage hose, operatively flow-connected to the trough. In order to facilitate removal of the discharge conduit 30, for permitting unhindered outward and downward swinging of the arm 15 away from the free end of the mandrel 13 when the roll of the material is to be removably supported thereon, the adjacent end of the mandrel may be suitably provided with an outlet bore 31, e.g. an offset bore extending from the trough to the axial end face of the mandrel for suitably fixedly seating therein a plumbing fixture or mounting nipple 32 for the adjacent end of discharge conduit 30 (see FIG. 4). Thus, discharge conduit 30 may be manually removably flow-connected with trough 14 by removable attachment of the end thereof as by forced friction fit engagement onto nipple 32 in outlet bore 31.

As a further optional, though preferred, feature of the invention, increased flow-inducing means may also be provided in known manner for enhancing removal of fluid received in the trough 14, such as a conventional suction pump or vacuum pump shown schematically at 33 operatively interposed within the drainage line or discharge conduit 30.

On the other hand, the drainage flow via discharge conduit 30 can be retarded by suitable flow restricting means of the conventional type (not shown) such as an adjustable flow pinch clamp where conduit 30 is made of flexible material, whereby to maintain a reservoir of spent fluid in trough 14 to help dissipate any residual energy remaining in the spent jet fluid as it enters the trough.

According to a modification of the invention, the trough 14 may also be desirably provided along its outward marginal portions located at the periphery of the mandrel with deflector shield means, e.g. in the form of deflector vanes or shields 34. This will aid in preventing outward escape or back flow or splashing of spent fluid such as water or water-containing liquid received in the trough since the resulting slot opening 35 between the opposed shields 34 may be selectively dimensioned whereby to provide a very narrow slot width sufficient to permit entry of spent fluid accurately into the trough 14 (see FIG. 2) yet close off its random outward escape more or less completely.

In any case, it will be realized that since the thickness of the fluid jet is relatively minute and only a small amount of kerf cut particles will be created during the cutting operation for each cut, the flow cross section or size of the trough 14 can be relatively small in width and depth (so long as it is wide and deep enough to collect and convey away the spent fluid), and in turn the presence of the trough will not materially affect the strength of the mandrel 13 used for effectively supporting the full weight of the roll of material removably thereon throughout the cutting operation.

In accordance with still another advantageous feature of the invention, the fluid jet cutter means may include a plurality of fluid jet nozzles 4 disposed on the outer end portions of the corresponding delivery tubes 26, with the latter being disposed in turn on the adjacent mounting portions of individual fluid jet cutter means 3 thereat (see FIG. 6). This will permit cutting of the roll simultaneously into an appropriate multiple number of smaller rolls.

In similar manner, each nozzle may be exchanged with other nozzles of selectively different orifice diameters, as the case may be, each simply removably threaded onto the adjacent end of the appropriate delivery tube 26 for corresponding precise adjustment in the same manner as shown in FIG. 2. Moreover, pronounced adjustment of the nozzle position with respect to the surface of the periphery of the roll of material 2 may be effected by appropriate adjustment of the nuts 28 as in the case of the embodiment shown in FIG. 2.

An appropriate axially elongated carriage means, shown schematically at 20*a*, is provided for achieving travel of the nozzles reciprocally back and forth along the axial extent of the base 22 in the same manner as shown in FIG. 1, preferably using a similar connection with drive screw 23 for this purpose. The control panel 21*a*, in addition to the controls mentioned heretofore in connection with the embodiment illustrated in FIG. 1, is also provided in this instance with manual adjustment knobs 36 connected with individual worm gears (not shown) of the conventional type for adjusting the axial spacing of the individual fluid jet cutter means 3 with respect to the carriage means 20*a* on which they are slidably mounted and with respect to each other, and in turn the relative axial positions of the nozzles 4 with respect to the roll of material 2.

In this way, the width of the individual multiple number of smaller rolls to be cut from the master roll or starting roll may be varied selectively. Such widths may all be the same or may be varied as among themselves in dependence upon the degree of adjustment via knobs 36 of the relative axial spacing of the nozzles with respect to each other.

It will be noted from FIG. 6 that the mandrel 13*a* need not be round in cross-section but may be provided in more or less flattened oval or ovate form or other form and thus contain the trough 13*a* appropriately in its periphery, e.g. along one of the more flattened surface portions thereof. Since the mandrel is generally designed to carry the weight of the roll of material whereas the chuck drive 10 is provided for rotating the roll on the mandrel, such out of round shape is appropriate. This is true so long as the major or flattened portion external diameter of the mandrel 13*a* is dimensioned with respect to the tubular core 12 of the roll, or to the internal diameter in the hollow interior of the roll when the tubular core is omitted, such that unhindered mounting of the roll on the mandrel can be effected as well as unhindered rotation of the roll about the mandrel.

Thus, the clearance between the outermost peripheral portion of the mandrel and the innermost hollow interior of the tubular core, or of the roll itself when the core is omitted, must be sufficient in connection with all embodiments of the invention to permit sliding of the roll onto and axially along the mandrel and more or less minimum friction or binding between these elements during rotation of the roll for the actual cutting operation. Furthermore, after the severing has been completed the smaller rolls must readily be able to be individually removed from the free end of the mandrel, i.e. upon disengaging discharge conduit 30 from nipple 32 and swinging away arm 15 in the manner described above.

One advantage of the use of carriage means 20 or 20*a* is that the roll may be cut into a plurality of smaller rolls, one at a time using the single nozzle on carriage means 20 as shown in FIG. 1, or several at a time in selective individual widths using the plurality of nozzles or carriage means 20*a* shown in FIG. 6. Thus, starting at the left-most end of the roll of material 2, as shown in FIG. 1, the roll may be cut successively into smaller rolls 2*a* of the same or different width, with the carriage means 20 being manually or automatically displaced to the right a selective axial distance corresponding to the next width cut to be made, and preferably by appropriate control of the driving screw 23. Similar simultaneous cut results may be obtained using the plurality of nozzles, as shown in FIG. 6, each time manually or automatically moving the carriage 20*a* to the right a selective axial distance corresponding to the next set of rolls to be simultaneous cut, and preferably by similar control of the driving screw 23, followed by individual axial interspacing adjustment among the nozzles by appropriate use of control knobs 36.

Upon cutting through of each smaller roll from the main roll of material 2, whether using a single nozzle or a plurality of nozzles simultaneously, the several smaller rolls remain idle on the mandrel when the remainder of the roll is rotated by the chuck drive 10 about the mandrel during the next cutting operation.

While the plurality of nozzles shown in the embodiment of FIG. 6 are provided in substantially radially aligned relation along the axis, i.e. substantially lie in a plane radially intersection the axis along its length as opposed to a plane intersecting the axis crosswise or transversely at one axial point, it is also possible to stagger selectively the nozzles radially with respect to each other about the periphery of the roll of material. The latter type arrangement may be advantageously employed where the interspacing of the nozzles for cutting simultaneously smaller width rolls of very narrow width cannot be maintained because the overall width dimensions of the adjacent nozzles exceed the narrow width of the simultaneous cuts to be made.

Accordingly, the nozzles 4 may be mounted via their delivery tubes 26 appropriately on a similar common carriage means (not shown) in selectively radially offset relation along the axis, with the mandrel 13*b* in such instance being correspondingly provided with a concordant number of troughs 14*b* defined in its periphery in operatively flow aligned relation to the respective nozzles (see FIG. 7). The orientation of the delivery tubes 26 with respect to the carriage means in question may be suitably provided in known manner by correspondingly offset mountings or the delivery tubes 26 themselves may be appropriately shaped to achieve a resultant offset relation therebetween for obtaining a corresponding selectively radially offset relation along the axis.

It will be noted from FIG. 7 that the axial distance apart of the pair of radially offset nozzles will generally be less than the width dimension or outside diameter of a given nozzle so that simultaneous cuts can be made to sever very narrow width smaller rolls from the main roll. Otherwise, the arrangement shown in the embodiment of FIG. 6 would normally suffice, since the nozzles in the latter relation can be adjusted if desired via control knobs 36 to place all of the nozzles in side by side close abutting relation for simultaneous cutting of a plurality of smaller rolls having a common selective width which can be as narrow as the interspacing between the abutting nozzles.

A conventional fluid jet cutter means system may be employed for delivering the fluid jet to a single nozzle or a plurality of such nozzles as the case may be. Such a system, insofar as pertinent to an understanding of the instant concept and related in orientation to the arrangement of the present invention, is schematically shown in FIG. 8.

A pressure fluid medium such as water or a water-containing liquid, perhaps also containing a conventional additive polymer, e.g. a long chain polymer, may be fed from a supply reservoir 50 via a supply line 51 to a high pressure pump 52 and be fed therefrom under high delivery pressure, optionally via an intervening pressure surge chamber or accumulator (not shown), through delivery line 53 containing a suitable shut-off control valve 54, which along with pump 52 may be operated for instance via suitable control switches and/or knobs at panel 21 of carriage means 20.

Appropriate actuation of valve 54 causes the pressure fluid medium to be fed via the delivery line 53 to the corresponding nozzles 4 by a conventional parallel feed arrangement. Upon exiting from the nozzles the individual fluid jets 4a cut circumferentially into and completely through the roll of material 2 during its rotation about mandrel 13. The spent effluent, for instance including kerf cut particles and dust in slurry form with water, is collected in the trough 14 and flows via discharge conduit 30 to a suitable drainage point 55.

If desired, the kerf cut particles, e.g. finely cut paper stock particles where the roll of material is paper, may be recovered from the slurry, reclaimed, and recycled to a roll material fabrication step, all in conventional manner, e.g. for use in a pulp step in paper making. The liquid phase of the slurry may also be after-treated in known manner to recover portions of water or additive polymer or any other constituents present for further economic use thereof.

It will be realized that the panel controls whether located on panel 21 or panel 21*a* or elsewhere, may be conveniently operated in known manner to vary selectively the delivery flow rate of the high pressure pump 52 in dependence upon the diameter size of the nozzle orifice and the number of nozzles being used, so as to regulate directly the jet cutting delivery pressure or force of the fluid jet exiting from the corresponding nozzle or nozzles. Generally, where a plurality of nozzles is contemplated, the delivery pressure will be distributed equally via a parallel flow system (see FIG. 8) to all of the nozzles, although separate shut-off valves (not shown) may be provided in the individual lines to the nozzles, similarly controlled by such panel controls or the like, for selective cut-off of flow to one or more of such nozzles as may be desired.

Moreover, the orifices of the plurality of nozzles need not always have the same diameter size, such as in those cases where the axial extent of the strip constituting the roll of material is not uniform but perhaps contains parallel running zones of material or fabric of differential ply thickness or of differential ply softness or hardness in relation to the cutting force and/or jet diameter needed to cut through the roll at the corresponding axial points.

Delivery pressures of for example between about 30,000 to 60,000 psi (2109 to 4218 kg/cm$^2$) may be readily generated, if desired, by such conventional equipment for use according to the invention in cutting rolls of material of the most varied types and strip constitutions. Nozzle orifice diameter sizes of for example between about 0.003 to 0.012 in. (0.076 to 0.304 mm) may be similarly employed according to the invention.

Naturally, these ranges of delivery pressures and orifice diameter sizes may vary and other delivery pressures and orifice diameter sizes outside of these ranges may also be used depending on the specific thickness and composition of the strip material constituting the roll to be cut in situ, e.g. thin paper, thick paper board, textile fabric, plastic, etc.

Furthermore, the speed of rotation of the roll of material can be readily increased where higher delivery pressures are used for ultimate extremely rapid severing of the roll of material into smaller rolls, using a single nozzle or a plurality of nozzles for simultaneous cutting.

Because the overall size range of the fluid jet in practice is actually small, consider the corresponding diameter size range of the nozzle orifice contemplated, such fluid jet cutting may be regarded as pinpoint type cutting, resulting in a very thin kerf and in turn leading to a correspondingly small amount of removed kerf cut particles or dust.

Understandably, therefore, the nozzle or nozzles can be oriented in relation to the axis and mandrel on which the roll of material is rotated so as to provide a pinpoint fluid jet path which not only lies in a plane crosswise of the axis but also which may vary from a normal transverse plane intersecting the axis, whereby to form a kerf cut defining a conical, or more precisely a partially hollow frusto-conical, configuration rather than the usual cylindrical, or more precisely right hollow cylindrical, configuration.

In any case, clean cutting without ragged edges or bent-over edges results by way of the cutting system and arrangement of the invention.

It will be appreciated that the cutting operation of the present invention lends itself to use of conventional automation equipment, mounting means and techniques such as for programming the delivery pressure of the fluid jet, the speed of rotating and number of revolutions of the roll of material to be cut in situ, the adjustment of the nozzle or nozzles both axially with respect to their interspacing and separately with respect to the roll as well as radially outwardly and inwardly with respect to the periphery of the roll, the timing of the cutting duration and fluid jet delivery before stoppage for the next movement of the carriage means along the axis, e.g. as per selective indexing technique, to the next cutting position, and the rate of removal of spent fluid from the collection point in the trough.

Of course, while only one revolution of the roll of material will generally suffice to achieve complete severing at any axial point selected, it may be necessary in certain instances to rotate the roll in excess of one revolution, e.g. 2 or 3 revolutions, as where the thickness and relative hardness of the strip material constituting the roll is such that at the given speed of rotation of the roll in relation to the delivery pressure of the fluid jet used, insufficient cutting through of the in situ material might occur.

Advantageously, in any case, the fluid jet cutting operation of the invention does not need a starting hole in the master roll of material to be cut in situ, does not have to enter tangentially against and into the side of the roll as in the case of a single knife type slitter, and is not limited to the cutting of only one ply at a time. Moreover, the instant cutting operation, whether using a single nozzle or plurality of nozzles, permits greater economies in time, labor, energy and material wastage, over the known methods of cutting master rolls or mill rolls of material into the variously required narrow widths. Normally, when the cutting is started, the penetration of the fluid jet completely radially inwardly through all of the plies of the roll of material in situ to the trough in the mandrel is accomplished in a fraction of a second so that the master roll or mill roll in question can start turning practically immediately.

In accordance with the description noted above, it will be clear that the function of the starting of the fluid jet for the cutting operation and the starting of the rotation of the roll of material can be effected by the actuation of a single switch, e.g. in a conventional circuit having a time delay relay, whereupon the fluid jet can make a complete cut through the master roll during one complete revolution of the roll in a matter of seconds. In turn, upon completion of the severing of the roll, the fluid jet can be shut off automatically and the carriage means can index to the next axial cutting point, for repeating the cycle. While the cutting operation would be taking place, of course, the resulting spent fluid and kerf cut particle slurry would be collected in the trough and discharged through the drainage system provided, whereby to prevent otherwise contamination of or concomitant detriment to the integrity of the material being cut by reason of the presence or accumulation thereat of such slurry.

It will be realized that the foregoing specification and drawings are set forth by way of illustration and not limitation and that various modifications and changes may be made therein without departing from the spirit and scope of the present invention which is to be limited only by the scope of the appended claims.

What is claimed is:

1. Fluid jet cutter arrangement for cutting a roll of material in situ comprising
   fluid jet cutter means including a fluid jet nozzle,
   support means for operatively relatively rotationally supporting removably a roll of material to be cut in situ in a position along an axis in radially inwardly disposed relation to the nozzle for relative rotational movement between the roll of material and the nozzle about the axis upon rotationally driving one of such roll and nozzle relative to the other, and further including rotational mounting and drive means for mounting correspondingly one of such roll and nozzle for driven rotation about the axis and relative to the other of such roll and nozzle, and
   fluid receiving means operatively disposed radially inwardly of the position of the roll of material for collecting spent fluid and for maintaining such collected spent fluid out of contact with such roll,
   the nozzle being selectively disposed in operatively flow aligned relation to the receiving means at a point along the axis for causing a fluid jet exiting from the nozzle to cut circumferentially into and through the roll of material in situ at such point and be collected by the receiving means during relative rotational movement between the nozzle and the roll of material upon such rotational driving of one of such roll and nozzle relative to the other.

2. Arrangement according to claim 1 wherein the support means includes rotational mounting means for mounting the roll of material for rotation about the axis in said position.

3. Arrangement according to claim 1 wherein the support means includes carriage means for moving the nozzle along the axis to change the selective disposition of the nozzle and the corresponding location of such point.

4. Arrangement according to claim 1 wherein the jet cutter means includes a plurality of such jet nozzles selectively disposed at axially spaced apart points along the axis for cutting the roll of material in situ simultaneously at such corresponding points.

5. Arrangement according to claim 4 wherein the nozzles are provided in substantially radially aligned relation along the axis.

6. Arrangement according to claim 4 wherein the nozzles are provided in selectively radially offset relation along the axis.

7. Arrangement according to claim 4 wherein the support means includes carriage means for moving the nozzles along the axis to change the selective disposition of the nozzles and the corresponding locations of such points.

8. Arrangement according to claim 4 wherein the support means includes rotational mounting means for mounting the roll of material for rotation about the axis in said position.

9. Arrangement according to claim 1 wherein removal means are provided for removing fluid received in the receiving means.

10. Arrangement according to claim 9 wherein the removal means include a discharge conduit operatively flow-connected to the receiving means.

11. Arrangement according to claim 10 wherein increased flow-inducing means are provided for enhancing removal of fluid received in the receiving means.

12. Arrangement according to claim 1 wherein the support means includes a mandrel extending along the axis for operatively supporting thereon the roll of material for relative rotational movement therebetween.

13. Arrangement according to claim 12 wherein the receiving means includes a trough selectively defined in the periphery of the mandrel in operatively flow aligned relation to the nozzle.

14. Arrangement according to claim 13 wherein the trough axially extends along the mandrel sufficiently to provide such flow aligned relation to the nozzle in any selective disposition of the nozzle.

15. Arrangement according to claim 14 wherein the axis is a substantially horizontal axis and the trough is provided with an internal flow path operatively downwardly inclined with respect to such horizontal axis along the mandrel substantially from one axial end portion of the trough to the other.

16. Arrangement according to claim 13 wherein the trough is provided along its outward marginal portions located at the periphery of the mandrel with deflector shield means to prevent outward escape of fluid received in the trough.

17. Fluid jet cutter arrangement for cutting a roll of material in situ comprising
   liquid jet cutter means including a liquid jet nozzle,
   support means including a mandrel extending along a substantially horizontal axis for operatively rotationally supporting removably thereon a roll of material to be cut in situ in a position along the axis in radially inwardly disposed relation to the nozzle for relative rotational movement between the roll of material and the nozzle and mandrel about the axis upon rotationally driving such roll, and further including rotational mounting and drive means for mounting the roll of material for driven rotation about the axis and about the mandrel in said position, and
   a liquid receiving trough operatively disposed radially inwardly of the position of the roll of material and selectively defined in the periphery of the mandrel for collecting spent liquid,
   the nozzle being selectively disposed in operatively flow aligned relation to the trough at a point along the mandrel for causing a liquid jet exiting from the nozzle to cut circumferentially into and completely through the roll of material in situ at such point and be collected by the trough during rotation of the roll of material upon such rotational driving of such roll.

18. Arrangement according to claim 17 wherein the support means includes carriage means for moving the nozzle along the axis to change the selective disposition of the nozzle and the corresponding location of such point, and the trough axially extends along the mandrel sufficiently to provide such flow aligned relation to the nozzle in any selective disposition of the nozzle.

19. Arrangement according to claim 18 wherein the trough is provided with an internal flow path operatively downwardly inclined with respect to such horizontal axis along the mandrel substantially from one axial end portion of the trough to the other sufficiently to impart directional flow of liquid received in the trough.

20. Arrangement according to claim 18 wherein the trough is provided along its outward marginal portions located at the periphery of the mandrel with deflector shield means to prevent outward escape of liquid received in the trough.

21. Arrangement according to claim 18 wherein removal means are provided for removing liquid received in the trough including a discharge conduit operatively flow-connected to the trough.

22. Arrangement according to claim 21 wherein increased flow-inducing means are provided for enhancing removal of liquid received in the trough.

23. Arrangement according to claim 22 wherein the increased flow-inducing means includes a suction pump for enhanced drainage in the discharge conduit.

24. Arrangement according to claim 17 wherein the liquid jet cutter means includes a plurality of such liquid jet nozzles selectively disposed at axially spaced apart points along the axis for cutting the roll of material simultaneously at such corresponding points.

25. Arrangement according to claim 24 wherein the nozzles are provided in substantially radially aligned relation along the axis.

26. Arrangement according to claim 24 wherein the nozzles are provided in selectively radially offset relation along the axis.

27. Arrangement according to claim 24 wherein the support means includes carriage means for moving the nozzles along the axis to change the selective disposition of the nozzles and the corresponding locations of such points, and the trough axialy extends along the mandrel sufficiently to provide such flow aligned relation to the nozzles in any selective disposition of the nozzles.

28. Arrangement according to claim 27 wherein removal means are provided for removing liquid received in the trough including a discharge conduit operatively flow-connected to the trough.

29. Arrangement according to claim 28 wherein increased flow-inducing means are provided for enhancing removal of liquid received in the trough including a suction pump for enhanced drainage in the discharge conduit.

30. Method for fluid jet cutting of a roll of material in situ comprising rotating a fluid jet nozzle and a roll of material to be cut in situ relatively to each other about an axis with the roll of material in radially inwardly disposed relation to the nozzle while directing a fluid jet exiting from the nozzle at a selective axial point along the extent of the roll of material to cut circumferentially into and through the roll of material in situ, and collecting spent fluid radially inwardly of the roll of material during such directing of the fluid jet and maintaining such collected spent fluid out of contact with such roll.

31. Method according to claim 30 wherein the roll of material is rotated and the nozzle is maintained rotationally stationary, and the fluid jet is a liquid jet.

32. Fluid jet cutter arrangement for cutting a roll of material in situ comprising fluid jet cutter means including a fluid jet nozzle, support means including a mandrel extending along a substantially horizontal axis for operatively rotationally supporting removably thereon a roll of material to be cut in situ in a position along the axis in radially inwardly disposed relation to the nozzle for relative rotational movement between the roll of material and the nozzle and mandrel about the axis upon rotationally driving such roll, and further including rotational mounting and drive means for mounting the roll of material for driven rotation about the axis and about the mandrel in said position, and fluid receiving means operatively disposed radially inwardly of the position of the roll of material and selectively defined in the periphery of the mandrel for collecting spent fluid, the nozzle being selectively disposed in operatively flow aligned relation to the receiving means at a point along the mandrel for causing a fluid jet exiting from the nozzle to cut circumferentially into and through the roll of material in situ at such point and be collected by the receiving means during rotation of the roll of material upon such rotational driving of such roll.

* * * * *